United States Patent

[11] 3,611,081

| [72] | Inventor | Tritus F. Watson<br>Charlottesville, Va. |
|---|---|---|
| [21] | Appl. No. | 25,812 |
| [22] | Filed | Apr. 6, 1970 |
| [45] | Patented | Oct. 5, 1971 |
| [73] | Assignee | Sperry Rand Corporation |

[54] COUNTER EMF COMMUTATED SELF-STARTING BRUSHLESS D.C. MOTOR
4 Claims, 1 Drawing Fig.

[52] U.S. Cl. .......................................................... 318/138,
313/254, 313/331
[51] Int. Cl. ....................................................... H02k 29/00
[50] Field of Search ............................................ 313/699,
685, 254, 138, 439, 331

[56] References Cited
UNITED STATES PATENTS

| 3,274,471 | 9/1966 | Moczala | 318/254 |
| 3,304,481 | 2/1967 | Saussele | 318/138 |
| 3,488,566 | 1/1970 | Fukuda | 318/138 |

*Primary Examiner*—G. R. Simmons
*Attorney*—S. C. Yeaton

ABSTRACT: The stator windings of a brushless DC motor are energized through individual silicon controlled rectifiers arranged in a ring counter circuit which is triggered from a pulse source. When the motor is to be started, an AND gate forces the first pulse to trigger a specific silicon controlled rectifier. The AND gate then permits subsequent pulses to be steered to various silicon controlled rectifiers in the desired sequence. The pulse source is synchronized through an OR gate coupled to receive signals from each stator winding. When a given silicon controlled rectifier is turned off, the corresponding stator winding is deenergized. The motion of the rotor, however, induces a counter EMF in the deenergized winding. This counter EMF is applied through the OR gate to synchronize the pulse source.

PATENTED OCT 5 1971
3,611,081
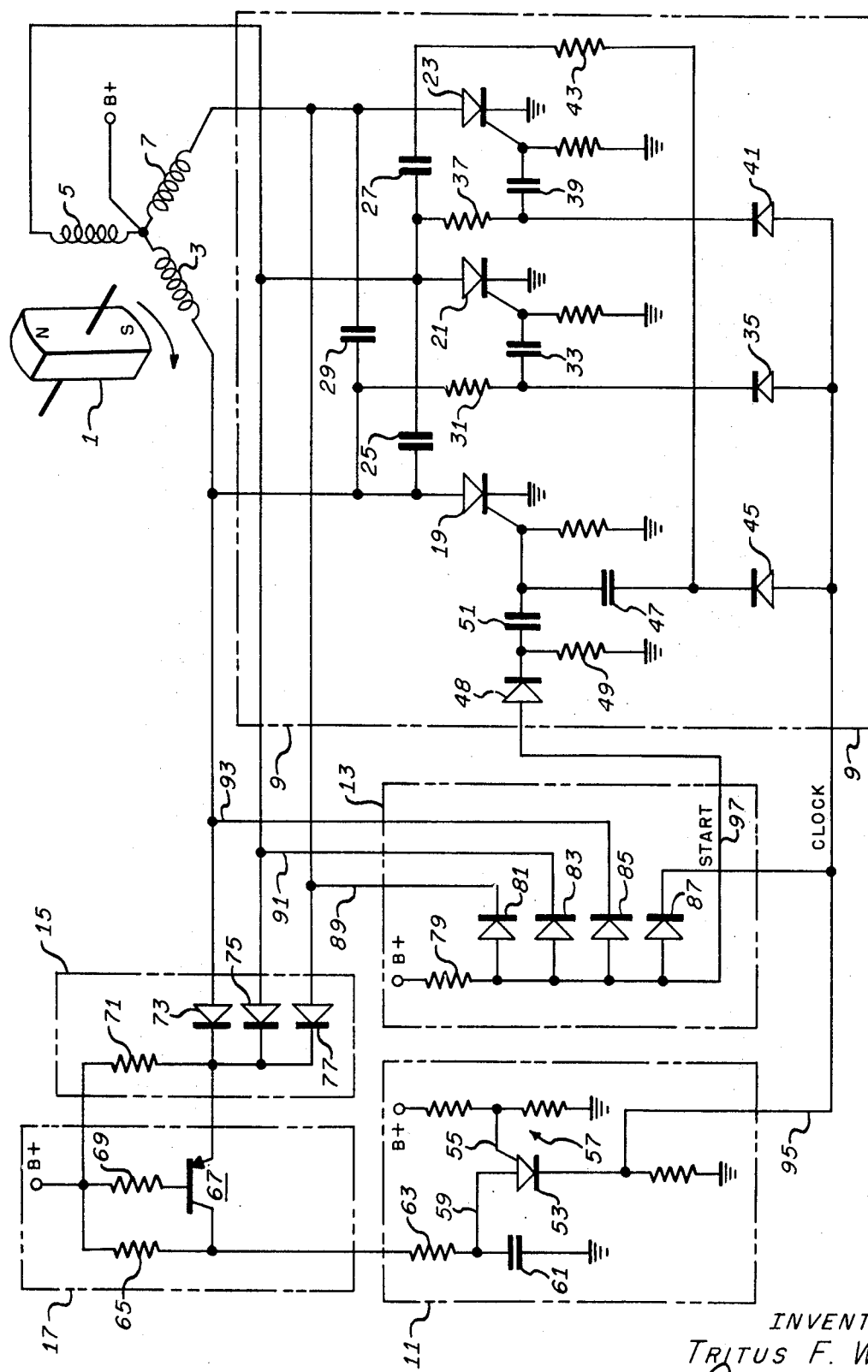
INVENTOR
TRITUS F. WATSON
BY
Joseph M. [signature]
ATTORNEY 3,611,081

COUNTER EMF COMMUTATED SELF-STARTING BRUSHLESS D.C. MOTOR

BACKGROUND OF THE INVENTION

1. Field of the Invention

This invention relates to brushless DC motors and more specifically to brushless DC motors that require neither optical nor mechanical rotor position sensors.

2. Description of the Prior Art

Brushless DC motors are well known in the prior art. These motors typically comprise a rotor magnetized along a diameter and stator windings arranged around the periphery of the motor. The individual stator windings are energized in a sequence that causes the magnetized rotor to revolve in a desired direction.

Such motors require a sensing means to detect instantaneous rotor position and provide a switch signal for energizing individual stator windings in the proper sequence and at the proper time. Typically, brushless DC motors may utilize optical sensing means for this purpose. A light source, for instance, may be caused to rotate with the rotor so as to illuminate successive photocells around the periphery of the motor. Similarly, Hall Effect transducers have been used as position sensors in some brushless DC motors.

Although such prior art sensing means have proven valuable in motors of this type, such means require elaborate mechanical construction and considerable maintenance.

SUMMARY OF THE INVENTION

Commutation of a brushless DC motor is accomplished according to the principles of the present invention by utilizing potentials developed at the individual stator windings of the motor to determine the mode and timing of the commutation function.

BRIEF DESCRIPTION OF THE DRAWINGS

The accompanying FIGURE is a diagram, partly in perspective, illustrating a presently preferred form of the invention.

DESCRIPTION OF THE PREFERRED EMBODIMENT

Referring now to the FIGURE, a magnetized rotor 1 is arranged to rotate about its axis in response to magnetic fields produced by the stator windings 3, 5 and 7. These windings are energized in response to the output of a conventional ring counter circuit 9. The ring counter circuit is triggered by signals from a pulse source 11.

An AND circuit 13 is used to determine the mode of the signal applied to the ring counter circuit 9 and an OR gate 15 is used to produce command signals that operate a synchronizing circuit 17.

The ring countercircuit contains silicon controlled rectifiers 19, 21 and 23. These silicon controlled rectifiers are used as switching elements in individual switching states that permit current flow through the various stator windings. A commutating capacitor 25 interconnects the anodes of the silicon controlled rectifiers 19 and 21. Similarly, a second commutating capacitor 27 interconnects the anodes of the silicon controlled rectifiers 21 and 23 and a third commutating capacitor 29 interconnects the anodes of the silicon controlled rectifiers 19 and 23.

A triggering circuit including a resistor 31, a capacitor 33 and a steering diode 35 is used to actuate the gate electrode of the silicon controlled rectifier 21. Similarly, a resistor 37, a capacitor 39 and a steering diode 41 are used to actuate the gate electrode of the silicon controlled rectifier 23. The silicon controlled rectifier 19 is triggered through a resistor 43, a steering diode 45 and a capacitor 47.

The silicon controlled rectifier 19 may also be triggered through a steering diode 48, a resistor 49 and a capacitor 51 when the motor is to be started. The function of this latter circuit will be explained in detail.

The pulse source 11 preferably contains a programmable unijunction transistor 53. A reference electrode 55 of the transistor 53 is energized from a suitable voltage divider 57. The electrode 59 of the transistor 53 is connected through a capacitor 61 to ground. The capacitor 61 is further connected to a positive source of voltage B+ through a pair of resistors 63 and 65. The resistor 63 typically has a value in the order of 2,000 ohms. Thus the nominal pulse repetition rate of the pulse source is determined by the valve of the capacitor 61 and the total resistance of the resistors 63 and 65.

The synchronizing circuit 17 contains a transistor 67 having its base electrode connected to the positive source of voltage through a base resistor 69. Typically, this base resistor has a value of approximately 90 ohms whereas the resistor 65 has a value in the order of 200,000 ohms so as to maintain the transistor 67 in a normally cutoff state. The sychronizing circuit is actuated from the OR circuit 15. The OR circuit is energized from the source of positive voltage through a resistor 71 and contains three diode elements 73, 75 and 77. The resistor 71 in the OR circuit typically has a value of about 1,000 ohms. The diodes in the OR circuit 15 are connected to stator winding junction points A, B and C connecting the stator windings 3, 5 and 7 and their corresponding silicon controlled rectifiers 19, 21 and 23 respectively.

The AND gate 13 contains a series resistor 79 and four diodes 81, 83, 85 and 87. The diodes 81, 83 and 85 are connected to the stator winding junction points between the stator windings and silicon controlled rectifiers through the lines 89, 91 and 93.

The transistor 53 in the pulse source 11 produces clock pulses on a line 95. These clock pulses are applied to each of the steering diodes 35, 41 and 45 in the ring counter circuit 9.

The output of the AND gate 13 constitutes a START pulse which is applied to the silicon controlled rectifier 19 through a line 97. Assume that the motor is to be started and the rotor is at rest in the position shown. Assume further, that clockwise rotation is desired and that the stator windings are constructed so that they attract the north pole of the rotor when energized.

With the motor at rest, each of the silicon controlled rectifiers in the ring counter circuit is in the nonconducting state. When energy is applied from the positive source of power B+ to the stator windings, each of the stator winding junction points will be at a high voltage level. This will cause the diodes 81, 83 and 85 in the AND gate 13 to be back biased. At the same time, when the voltage is applied from the source B+, the capacitor 61 in the pulse source 11 will begin to charge. As the voltage on this capacitor approaches the voltage applied to the reference electrode 55 of the transistor 53, this transistor will begin to conduct. Current from the transistor 53 will flow through the resistor connected to its cathode and a positive-going pulse will appear on the line 95. This will back bias the diode 87 in the AND gate 13 so as to produce an output pulse on the START line 97. The START pulse will be coupled to the gate electrode of the silicon controlled rectifier 19 through the diode 48 and the capacitor 51 and drive the silicon controlled rectifier 19 into conduction.

During the START mode of operation, the CLOCK pulse will be ineffective since each of the steering diodes 35, 41 and 45 will be back biased by virtue of the fact that they are also coupled to the stator winding junction points. When the silicon controlled rectifier 19 begins to conduct in response to a START pulse, the stator winding 3 will be energized, thus creating a magnetic field which attracts the north pole of the rotor 1 and causing the rotor to rotate in the clockwise direction. The silicon controlled rectifier 19 will remain conducting until the pulse source 11 produces another CLOCK pulse. At this time, the junction point A between stator winding 3 and the silicon controlled rectifier 19 is at a relatively low voltage therefore the diode 85 in and AND gate 13 will be forward biased so that the AND gate cannot produce a START pulse. The CLOCK pulse can not pass through the diodes 41 or 45 since these diodes are coupled to junction points B and C which are at a relatively high voltage level and therefore back biased. The steering diode 35, however, is coupled to junction point A associated with the anode of the conducting silicon controlled rectifier 19. The junction point is at a relatively low voltage therefore the CLOCK pulse can pass through the steering diode 35 and trigger the silicon controlled rectifier 21. The rectifier 21 is thereby driven into conduction so as to energize the stator winding 5. At the same time, the anode voltage of the silicon controlled rectifier 21 drops to a low value and commutates the silicon controlled rectifier 19 through the capacitor 25 so as to terminate conduction in the silicon controlled rectifier 19.

Since the stator winding 5 is now energized and the stator winding 3 is deenergized, the rotor 1 will continue to revolve in an attempt to align itself with the magnetic field produced by the winding 5. This action will generate a counter EMF in the stator winding 3 and cause the anode of the diode 73 in the OR gate 15 to become more positive than the power supply voltage B+. This causes the transistor 67 to conduct. In the meantime, the capacitor 61 in the pulse source 11 will have been charging at a relatively slow rate determined by the resistors 63 and 65. When the transistor 67 in the synchronizing circuit 17 is driven into conduction, however, the charging rate of the capacitor 61 will be greatly enhanced since the high resistance resistor 65 will be effectively bypassed. This will produce a CLOCK pulse almost immediately so as to advance the ring countercircuit by triggering the silicon controlled rectifier 23.

When the silicon controlled rectifier 23 fires, it will commutate the silicon controlled rectifier 21 through the capacitor 27. The resulting rotation of the rotor will induce a counter EMF in the stator winding 5 which will drive the diode 75 in the OR circuit 15 more positive and again cause conduction of the transistor 67. This will result in an increased charging rate for the capacitor 61 and again synchronize the output of the pulse source 11 with the rotation of the rotor 1. Thus the synchronizing circuit effectively increases the pulse repetition rate of the pulse source.

The output of the OR gate 15 applied to the emitter of the transistor 67 has been found to be sine wave superimposed on the B+ voltage. The transistor 67 is driven into conduction on the positive excursion of the sine wave voltage and remains in the conducting state until the negative excursion of the sine wave voltage drives the transistor 67 into the cutoff condition.

This action causes the transistor 53 to latch on due to the low resistance of the resistor 63 and remain in this condition until the negative excursion of the counter EMF from the OR gate 15 causes the transistor 67 to switch off and terminate conduction in the transistor 53. This action keeps the transistor 53 from oscillating and keeps the capacitor 61 from charging until the transistor 67 drops out of conduction.

As soon as the transistor 67 stops conducting, the capacitor 61 begins to charge slowly through the high resistance of the resistor 65 in the synchronizing circuit. During the time that the transistor 67 is conducting, the capacitor charges at a rate determined by the time constant of the resistor 63 and the capacitor 61.

The CLOCK pulse from the pulse circuit 11 can be made to occur at any conduction angle of the counter EMF by adjusting the time constant of the resistor 63 and the capacitor 61. This provides a means for switching at any desired shaft position so as to obtain maximum torque.

Although the invention has been described with reference to a wye-connected, three segment motor, it will be appreciated that the circuit of the invention can be applied to motors employing other stator-winding configurations. In general, the ring counter circuit must provide a switching stage for each stator winding.

Furthermore, although the pulse source has been described as a device employing a programmable unijunction transistor, it will be understood that other types of relaxation oscillators well known in the art may be employed for this purpose if desired. Essentially, the pulse source requires a charging capacitor, a voltage responsive discharge device and means for altering the charging rate of the capacitor.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A commutating circuit for a brushless DC motor of the type including permanently magnetized rotor rotatable between a plurality of stator windings energized from a DC source, said commutating circuit comprising a pulse source for producing CLOCK pulses at a given repetition rate, said pulse source including a relaxation oscillator having a charging capacitor arranged to accumulate charge at a given rate and a voltage responsive discharge means coupled to discharge said capacitor when the accumulated charge thereon reaches a given value, switching means for energizing individual stator windings in a desired sequence in response to pulses from said pulse source, said switching means including an individual switching stage corresponding to each stator winding, each of said switching stages being connected to the corresponding stator winding at an individual stator winding junction point, OR gating means coupled to respond to voltages at each of said junction points, said OR gating means further being arranged to produce an output signal whenever the voltage level at any of said junction points rises above the voltage level of said DC source, whereby said gating means provides an output signal in response to a counter EMF induced in said stator winding by the motion of said rotor, synchronizing means for increasing the charging rate of said capacitor in response to an output signal from said OR gating means, additional gating means responsive to the voltages at all of said junction points for providing a START pulse in response to a CLOCK pulse when the voltage at each of said junction points is substantially at the level of said DC source, and means to actuate a specified switching stage in response to a START pulse.

2. The circuit of claim 1 wherein said additional gating means is an AND gate, said AND gate including a group of diodes each connected to separate ones of said junction points, each of the diodes in said group being arranged to be back biased when the corresponding junction point is at a high voltage level and to be forward biased when the corresponding junction point is at a low voltage level, said AND gate further including a diode connected to be back biased by a CLOCK pulse, said AND gate further including output means for providing a START pulse when all of said diodes become back biased.

3. A commutating circuit for a brushless DC motor of the type including a permanently magnetized rotor and a plurality of stator windings energized from a DC source and arranged to cause rotation of said rotor, said commutating circuit comprising a ring countercircuit including a switching stage corresponding to each of said stator windings, individual stator winding junction points connecting each stator winding to the corresponding switching stage in the ring countercircuit, a source of clock pulses coupled to each stage in said ring countercircuit, said source being constructed to produce pulses at a nominal repetition rate, fist gating means responsive to the instantaneous voltage level of all stator winding junction points and to the presence of a CLOCK pulse, means in said first gating means for producing a START pulse when said gating means detects a high voltage level at each of said stator winding points in the presence of a CLOCK pulse, means for triggering a specific stage in said ring counter circuit in response to a START pulse, second gating means responsive to the voltage level of each of said stator winding junction points, said second gating means being constructed to produce a specific output signal whenever the voltage level at each of said stator winding junction points rises above the level of said DC source, and means to accelerate the pulse repetition rate of said pulse source in response to a specified output signal from said second gating means.

4. A commutating circuit for a brushless DC motor of the type including a permanently magnetized rotor rotatable between a plurality of stator windings energized from a DC source, said commutating circuit comprising a pulse source for producing CLOCK pulses at a given repetition rate, switching means for energizing individual stator windings in a desired sequence in response to pulses from said pulse source, gating means responsive to counter EMFs induced in said stator windings by the motion of said rotor, said gating means being constructed to provide an output signal when the counter EMF induced in any stator winding exceeds a predetermined value, synchronizing means for accelerating the pulse repetition rate of said pulse source in response to a signal from said gating means, additional gating means responsive to the voltages at all of said junction points for providing a START pulse in response to a CLOCK pulse when the voltage at each of said junction points is substantially at the level of said DC source, and means to actuate a specified switching stage in response to a START pulse.